United States Patent [19]

Yoxtheimer

[11] 4,009,902
[45] Mar. 1, 1977

[54] CONVERTIBLE ROOF FOR A MOTOR VEHICLE

[76] Inventor: Robert Yoxtheimer, 177 Devoe Ave., Yonkers, N.Y. 10705

[22] Filed: Oct. 15, 1975

[21] Appl. No.: 622,759

[52] U.S. Cl. .......................................... 296/137 B
[51] Int. Cl.² .......................................... B60J 7/10
[58] Field of Search ......... 296/137 B; 49/255, 258, 49/372, 374, 366

[56] References Cited

UNITED STATES PATENTS

| | | | |
|---|---|---|---|
| 2,551,239 | 5/1951 | Bond | 296/137 B |
| 3,628,828 | 12/1971 | Page | 296/137 B |
| 3,731,968 | 5/1973 | Duffield | 296/137 B |
| 3,782,776 | 1/1974 | Ormont | 296/137 B |

*Primary Examiner*—Robert R. Song
*Attorney, Agent, or Firm*—Jack D. Slobod

[57] ABSTRACT

A convertible roof for a station wagon is formed by a pair of doors which are retractable into generally vertically oriented tracks along opposite sidewalls of the vehicle. The doors at their lower ends carry projecting rollers which are engaged in the tracks. Sockets are formed at the upper extremes of the tracks for engaging the rollers to enable the doors to be pivoted at the roof line.

2 Claims, 3 Drawing Figures

CONVERTIBLE ROOF FOR A MOTOR VEHICLE

FIELD OF THE INVENTION

The present invention relates to a convertible roof for a motor vehicle such as a station wagon. In its particular aspects the present invention relates to the formation of a vehicle roof by a pair of doors which may be swung open and retracted into the motor vehicle.

BACKGROUND OF THE INVENTION

In motor vehicles such as station wagons, it frequently occurs that relatively tall items cannot be carried because of restrictions imposed by the usual roof. While it has been proposed in the prior art to provide moveable members or doors in the roof of a station wagon for increased cargo space, such techniques have not to my knowledge been manufactured because of various disadvantages associated therewith. For example, in U.S. Pat. No. 3,782,776 to Ormont, the doors forming the station wagon roof when opened are retained projecting upward from the vehicle in a manner presenting a dangerous condition in that they may be blown over by wind loads.

OBJECTS OF THE INVENTION

It is an object of the present invention to provide a convertible roof for a motor vehicle formed of a pair of doors which when opened are retractable into the motor vehicle.

It is a further object of the present invention to provide a station wagon body design which enables the station wagon to be converted to a cargo carrying vehicle having an open top.

SUMMARY OF THE INVENTION

Briefly, the aforementioned and other objects of the present invention are satisfied by providing a station wagon type motor vehicle having a large rectangular opening in its roof communicating with, and about the same width as, the tail gate of the vehicle. A pair of track means run vertically along opposite sidewalls of the vehicle. The track means have upper extremes along opposite sides of the opening.

Within the track means are mounted a pair of doors which may be retracted therein. The doors carry rollers at their lower ends which are engaged in the track means. Sockets are formed at the upper extremes of the track means for pivotly engaging the rollers to enable the doors to be pulled upward out of the track means until the rollers are engaged in the sockets. Then the doors may be rotated downward toward each other till they are in the plane of the roof in double door configuration with their free edges adjoining each other.

The undersides of the free edges carry mutually engageable catches to enable the doors to be locked or unlocked from the interior of the vehicle.

Since for carrying a tall cargo, the doors are swung upwards and retracted into the vehicle, no wind loading problem is presented by the doors.

Other objects, features and advantages of the present invention will become apparent upon perusal of the following detailed description of the preferred embodiment thereof when taken in conjunction with the appended drawing wherein.

DETAILED DESCRIPTION

Figure 1:
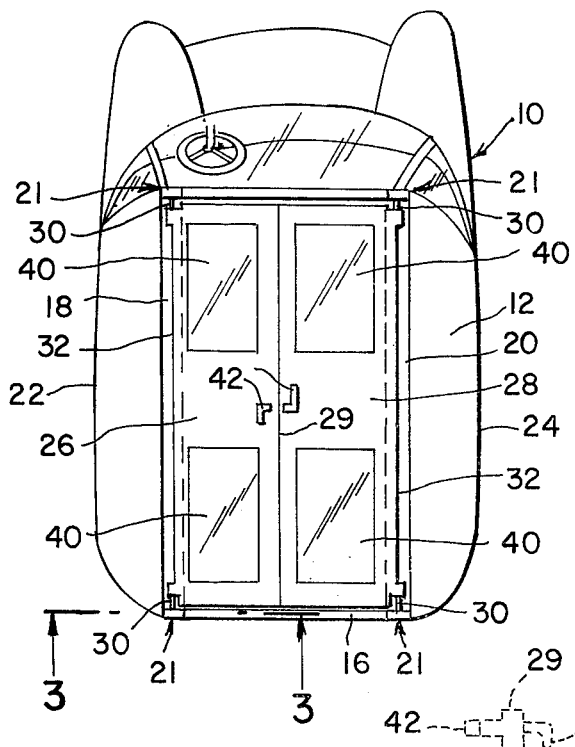
FIG. 1 is a top view of a vehicle constructed according to the principles of the present invention.
Figure 2:
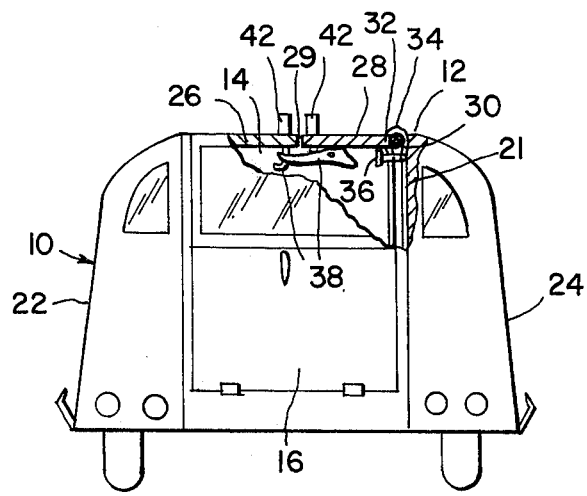
FIG. 2 is a rear elevational view of the vehicle in FIG. 1 with a portion thereof broken away in section.
Figure 3:
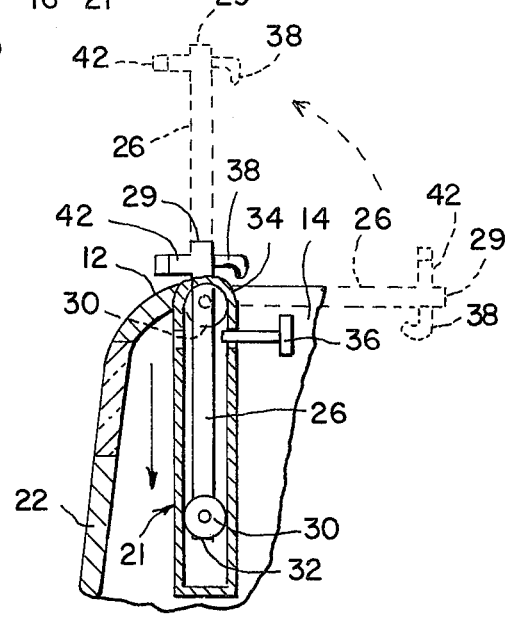
FIG. 3 is an enlarged partial cross-sectional elevational view taken along the lines 3—3 in FIG. 1.

Referring to FIGS. 1 through 3 of the drawing there is illustrated a compact station wagon vehicle 10 having a roof 12 constructed according to the principles of the present invention. The roof 12 has a rectangular opening 14 running substantially the entire length of the roof. The opening 14 has generally the same transverse dimension or width as a tailgate 16 for vehicle 10 and communicates with the tail gate in a manner that when the tailgate is swung downward a tall cargo may be placed on the floor of the station wagon via the tailgate.

A pair of slots or open pockets 18 and 20 run longitudinally of roof 12 along opposite sides of opening 14. At the forward and rearward extremes of slots 18 and 20 there are formed tracks 21 which run generally vertically downward into the vehicle 10 along the opposite sidewalls 22 and 24 of the vehicle.

The rectangular opening 14 is closed by a pair of doors 26 and 28 which are normally located in the plane of the roof. Doors 26 and 28 adjoin each other at their free edges 29 along the center line of roof 12. The doors carry forwardly and rearwardly projecting rollers 30 at their transverse extreme edges 32 which are engaged in tracks 20. The rollers 30 are removeably engaged for pivoting in sockets 34 formed at the upper extremes of tracks 20 by any suitable means such as removeable pins 36 projecting across the tracks to form a lower portion of the sockets.

To enable the doors 26, 28 to be locked or unlocked from the inside of vehicle 10, mutually engageable catches 38 are respectively mounted to the underside of doors 26, 28 proximate free edges 29. Also provided are glass windows 40 in doors 26 and 28 for admitting sunlight to the interior of the vehicle and handles 42 for providing a grip for swinging the doors open about sockets 34.

For accommodating a tall cargo the catches 38 are unlocked and the doors 26 and 28 are swung upward to a vertical position. Then the pins 36 are removed to disengage rollers 30 from sockets 34. As a result, the doors will retract vertically downward through slots 18 and 20 with the rollers 30 guiding the doors vertically along tracks 20 until the downwardly facing door edges 32 reach the bottom of the tracks.

It should be appreciated that with the doors 26 and 28 retracted into the vehicle no wind loading is introduced by the doors being open. To close roof 12, the doors are pulled upward from tracks 20 until rollers 30 are engaged in sockets 34, utilizing pins 36. Then the doors are swung downward and towards each other into the plane of the roof.

As additional features concomitant with the increased cargo carrying capacity of vehicle 10, the tail gate 16 may be constructed with extra heavy support bars (not shown) within its walls and a stop bar (not shown) may be provided behind the front seats of the vehicle to protect the seats from a shifting cargo on the floor of the vehicle.

While the preferred embodiment of the present invention has been described in specific detail it should be understood that numerous modifications, additions and omissions in the details thereof are possible within the intended spirit and scope of the invention claimed herein.

What is claimed is:

1. A convertible roof for a motor vehicle having an opposed pair of sidewalls comprising:

a rectangular opening in the roof of the vehicle; a pair of track means running generally vertically within the vehicle along said opposite sidewalls, said track means having upper extremes positioned along opposite sides of said roof opening; a pair of doors respectively mounted in said track means for enabling generally vertical movement of said doors, said doors being positionable along said track means and when so positioned having lower ends; pivot means carried on the lower ends of said doors; and means on the upper extremes of said track means for engaging said pivot means, said doors being dimensioned so that when said pivot means are engaged in the upper extremes of said track means, said doors can be rotated downward toward each other for closing the roof opening.

2. The roof of claim 1 wherein said motor vehicle is a station wagon having a tailgate communicating with said roof opening.

* * * * *